United States Patent
Oikawa et al.

(10) Patent No.: US 10,196,316 B2
(45) Date of Patent: Feb. 5, 2019

(54) REINFORCEMENT METHOD FOR THREE-DIMENSIONAL SHAPED OBJECT

(71) Applicant: TOAGOSEI CO., LTD., Tokyo (JP)

(72) Inventors: Hiroshige Oikawa, Nagoya (JP); Yushi Ando, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 228 days.

(21) Appl. No.: 15/101,709

(22) PCT Filed: Dec. 3, 2014

(86) PCT No.: PCT/JP2014/081938
§ 371 (c)(1),
(2) Date: Jun. 3, 2016

(87) PCT Pub. No.: WO2015/083725
PCT Pub. Date: Jun. 11, 2015

(65) Prior Publication Data
US 2016/0304406 A1     Oct. 20, 2016

(30) Foreign Application Priority Data
Dec. 5, 2013   (JP) ................................. 2013-251678

(51) Int. Cl.
| | |
|---|---|
| *C04B 41/48* | (2006.01) |
| *C08F 22/32* | (2006.01) |
| *B33Y 70/00* | (2015.01) |
| *C04B 41/00* | (2006.01) |
| *C04B 41/63* | (2006.01) |
| *B05D 1/02* | (2006.01) |
| *C04B 41/46* | (2006.01) |
| *C08J 3/18* | (2006.01) |
| *C09D 4/00* | (2006.01) |
| *C09D 4/06* | (2006.01) |
| *C08F 222/32* | (2006.01) |
| *C08K 5/11* | (2006.01) |
| *C08K 5/12* | (2006.01) |

(52) U.S. Cl.
CPC .............. *C04B 41/483* (2013.01); *B05D 1/02* (2013.01); *B33Y 70/00* (2014.12); *C04B 41/009* (2013.01); *C04B 41/46* (2013.01); *C04B 41/63* (2013.01); *C08F 22/32* (2013.01); *C08J 3/18* (2013.01); *C09D 4/00* (2013.01); *C09D 4/06* (2013.01); *C08F 2222/327* (2013.01); *C08J 2333/12* (2013.01); *C08K 5/11* (2013.01); *C08K 5/12* (2013.01)

(58) Field of Classification Search
None
See application file for complete search history.

(56) References Cited

U.S. PATENT DOCUMENTS

| | | | |
|---|---|---|---|
| 4,364,876 A | 12/1982 | Kimura et al. | |
| 5,204,055 A | 4/1993 | Sachs et al. | |
| 2002/0026982 A1* | 3/2002 | Bredt | B28B 1/00 156/284 |
| 2005/0003189 A1 | 1/2005 | Bredt et al. | |
| 2005/0215744 A1 | 9/2005 | Wiese et al. | |

FOREIGN PATENT DOCUMENTS

| | | |
|---|---|---|
| CA | 2 338 617 A1 | 5/2000 |
| JP | 56-135455 A | 10/1981 |
| JP | 6-218712 A | 8/1994 |
| JP | 11-124522 A | 5/1999 |
| JP | 2000-53924 A | 2/2000 |
| JP | 2002-528375 A | 9/2002 |
| JP | 2007-502713 A | 2/2007 |
| JP | 2009-28668 A | 2/2009 |
| JP | 2010-515605 A | 5/2010 |
| JP | 2013-103999 A | 5/2013 |
| WO | 00/026026 A | 5/2000 |
| WO | 2008-86033 A | 7/2008 |

OTHER PUBLICATIONS

Machine Translation of JP H11-124522 A (Year: 2018).*
Chinese Patent Office (SIPO) Office Action dated Apr. 6, 2017 issued in CN Appln. 2014480066092.1.
EPO Communication with Supplementary Search Report, dated Jun. 19, 2017, issued in EP Application 14 86 7004.5.
Chinese Patent Office (SIPO) Office Action (second), with translation, dated Dec. 14, 2017 issued in CN Appln. 2014480066092.1.
International Search Report for PCT/JP2014/081938 dated Mar. 3, 2015; English Translation submitted herewith (5 Pages).
Office Action issued by JPO dated Jun. 1, 2017 against JP Appln. 2015-551531.
Chinese Patent Office (SIPO) Office Action (third), with translation, dated Jun. 14, 2018 issued in CN Appln. 2014480066092.1.
Office Action, Taiwan (ROC), dated Jun. 12, 2018, in counterpart Taiwan application 103140121.

* cited by examiner

*Primary Examiner* — Shamim Ahmed
*Assistant Examiner* — Bradford M Gates
(74) *Attorney, Agent, or Firm* — Fitch, Even, Tabin & Flannery, LLP

(57) ABSTRACT

Provided is a method for easily reinforcing a three-dimensional shaped object. The method for reinforcing a three-dimensional shaped object comprises reinforcing the three-dimensional shaped object using an impregnating composition containing a 2-cyanoacrylic acid ester having a specific structure, said impregnating composition having a viscosity at 25° C. in a range of from 1 to 1000 mPa·s, and said impregnating composition having a Shore hardness D in a range of from 20 to 75 when being hardened. Preferably, the three-dimensional shaped object is formed of an inorganic powder.

19 Claims, No Drawings

REINFORCEMENT METHOD FOR THREE-DIMENSIONAL SHAPED OBJECT

CROSS-REFERENCE TO RELATED APPLICATIONS

This application is a U.S. national phase application filed under 35 U.S.C. § 371 of International Application No. PCT/JP2014/081938, filed Dec. 3, 2014, designating the United States, which claims priority from Japanese Patent Application No. 2013-251678, filed Dec. 5, 2013, and the complete disclosures of which applications are hereby incorporated herein by reference in their entirety for all purposes.

TECHNICAL FIELD

The present invention relates to a method for reinforcing a three-dimensional shaped object by using an impregnating composition containing a specific 2-cyanoacrylic acid ester.

BACKGROUND ART

Recently, technologies for manufacturing models and components using three-dimensional modeling are quickly spreading. Three-dimensional modeling, which is a desktop process for making a desired object based on computer-aided design (CAD) data, is characterized in that it enables considerable reduction of the time from designing to production, production in small lots and customized manufacturing. Major methods of the three-dimensional modeling include stereolithographic process, sheet lamination process, and powder binding process.

Among the aforementioned processes, the powder binding process includes two types; one type which comprises fusing or sintering the powder by using lasers, and the other which comprises solidifying the powder using a binder. In the latter method, an inkjet printing technology is used for jetting a binder onto selected areas of a powder comprising gypsum or the like as the main component, thereby creating a solidified sectional layer. A three-dimensional shaped object can be obtained by laminating the thus-created sectional layers (see, for instance, Patent Documents 1 and 2). The powder binding process using the inkjet printing technology does not need any high output laser required in the stereolithographic process but only needs an apparatus easy to handle; however, the resulting shaped object is sometimes insufficient in strength, requiring reinforcement by impregnation of a molten wax, varnish, polyurethane-based adhesive, epoxy-based adhesive, or 2-cyanoacrylate-based adhesive.

The aforementioned 2-cyanoacrylate-based adhesive is widely used as the so-called instantaneous adhesive since it quickly polymerizes and cures to bond various adherends due to its high anion polymerizability under the presence of an anion moiety such as moisture present on a surface of an adherend or in the air. Furthermore, it is known that this adhesive is also used as an impregnating composition to refinforce wood-based materials or the like because it is lower in viscosity for adhesives (see, for example, Patent Document 3)

CONVENTIONAL TECHNICAL DOCUMENTS

Patent Documents

Patent Document 1: Japanese Patent Laid-open (Kokai) No. H06-218712.

Patent Document 2: Japanese Patent Laid-open (Kohyo) No. 2002-528375.

Patent Document 3: Japanese Patent Laid-open (Kokai) No. 2000-53924.

SUMMARY OF INVENTION

Problems to be Solved by the Invention

Although the aforementioned Patent Document 2 states that a 2-cyanoacrylate-based adhesive may be used for reinforcing a three-dimensional shaped object, it does not refer to any 2-cyanoacrylate-based adhesive suitable for reinforcing a three-dimensional shaped object.

Furthermore, the impregnating composition disclosed in Patent Document 3 is excellent in impregnation hardening properties for wood-based materials, however, is problematic in that the resulting shaped objects are inferior in cutting machinability when being made from inorganic powder, and the reinforced shaped objects suffer from blooming.

The present invention has been made in light of the above described problems, and the objective thereof is to provide a method which not only easily reinforces a three-dimensional shaped object but also provides a three-dimensional shaped object which is excellent in appearance and machinability.

Means for Solving the Problems

The present inventors have found that a three-dimensional shaped object can be efficiently reinforced by using an impregnating composition which contains a 2-cyanoacrylic acid ester having a specific structure, and exhibits a viscosity and a hardness of the hardened product in specific ranges. Furthermore, the three-dimensional shaped object obtained by the reinforcing method according to the present invention has been found to show no blooming but have excellent cutting machinability. The invention has been accomplished based on these findings.

Thus, according to one aspect to the present invention, there is provided a method for reinforcing a three-dimensional shaped object using an impregnating composition containing a 2-cyanoacrylic acid ester, in which the 2-cyanoacrylic acid ester is at least one selected from the group consisting of the compound represented by the following general formula (1) and the compound represented by the following general formula (2):

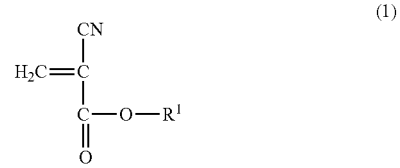
(1)

wherein $R^1$ represents a straight-chain or branched-chain alkyl group having from 3 to 12 carbon atoms, cycloalkyl group, allyl group, or aryl group; and

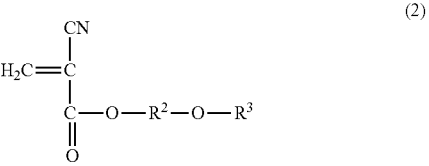
(2)

wherein R² represents an alkylene group having from 1 to 4 carbon atoms, and R³ represents a straight-chain or branched-chain alkyl group having from 1 to 8 carbon atoms, said impregnating composition having a viscosity at 25° C. in a range of from 1 to 1000 mPa·s, and said impregnating composition having a Shore hardness D in a range of from 20 to 75 when being hardened.

According to a preferred embodiment of the present invention, the aforementioned impregnating composition contains both the compound represented by the general formula (1) and the compound represented by the general formula (2).

According to another preferred embodiment of the present invention, the aforementioned impregnating composition further contains a plasticizer.

According to still another preferred embodiment of the present invention, the aforementioned three-dimensional shaped object is one produced by a powder binding process in which the powder is an inorganic compound.

Effect of the Invention

The method for reinforcing a three-dimensional shaped object according to the present invention is a method using an impregnating composition containing a 2-cyanoacrylic acid ester having a specific structure. Since the viscosity of the impregnating composition and the hardness of the hardened product thereof are set in specific ranges, the three-dimensional shaped object can be easily reinforced without impairing workability. Furthermore, the resulting three-dimensional shaped object is free of blooming and can be easily processed by cutting. The aforementioned "blooming" refers to a phenomenon in which volatilized 2-cyanoacrylic acid ester adheres to the neighborhood of the reinforced part and solidifies as powder so that the three dimensional shaped object becomes whitish.

DESCRIPTION OF EMBODIMENTS

Embodiments of the present invention are described below, but the present invention is not limited thereto.

The method for reinforcing a three-dimensional shaped object according to the present invention is carried out using an impregnating composition containing a 2-cyanoacrylic acid ester having a specific structure, in which the impregnating composition has a viscosity at 25° C. in a range of from 1 to 1000 mPa·s, and the impregnating composition exhibits a Shore hardness D in a range of from 20 to 75 when it is hardened.

The impregnating composition for use in the present invention contains a 2-cyanoacrylic acid ester, which is at least one of the compound represented by the following general formula (1) and the compound represented by the following general formula (2):

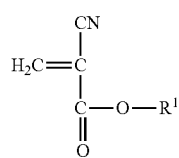
(1)

wherein R¹ represents a straight-chain or branched-chain alkyl group having from 3 to 12 carbon atoms, cycloalkyl group, allyl group, or aryl group; and

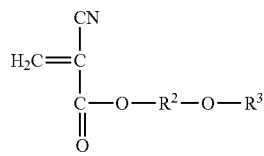
(2)

wherein R² represents an alkylene group having from 1 to 4 carbon atoms, and R³ represents a straight-chain or branched-chain alkyl group having from 1 to 8 carbon atoms.

As the above-mentioned 2-cyanoacrylic acid ester represented by the general formula (1), there can be mentioned 2-cyanoacrylic acid ester of, for example, n-propyl, i-propyl, allyl, n-butyl, i-butyl, n-pentyl, n-hexyl, cyclohexyl, phenyl, heptyl, 2-ethylhexyl, n-octyl, 2-octyl, n-nonyl, n-decyl, and n-dodecyl. These 2-cyanoacrylic acid esters may be used alone or in a combination of two or more thereof.

As the above-mentioned 2-cyanoacrylic acid ester represented by the general formula (2), there can be mentioned ester of, for instance, methoxyethyl, methoxypropyl, methoxyisopropyl, methoxybutyl, ethoxyethyl, ethoxypropyl, ethoxyisopropyl, propoxymethyl, propoxyethyl, isopropoxyethyl, propoxypropyl, butoxymethyl, butoxyethyl, butoxypropyl, butoxyisopropyl, butoxybutyl, hexoxymethyl, hexoxyethyl, hexoxypropyl, hexoxyisopropyl, hexoxybutyl, 2-ethylhexoxymethyl, 2-ethylhexoxyethyl, 2-ethylhexoxypropyl, 2-ethylhexoxyisopropyl, and 2-ethylhexoxybutyl. These 2-cyanoacrylic acid esters may be used alone or in a combination of two or more thereof.

The impregnating composition according to the present invention preferably comprises both the compound represented by the general formula (1) and the compound represented by the general formula (2) among the above-mentioned 2-cyanoacrylic acid esters. This is because the reinforced three-dimensional shaped object becomes more excellent in blooming prevention effect and cutting machinability when the compound represented by the general formula (1), which rapidly hardens when being impregnated to the three-dimensional shaped object, is contained in combination with the compound represented by the general formula (2), which provides flexible hardened products. In the aforementioned mixture, the proportion of the compound represented by the general formula (1) is preferably in a range of from 5 to 90 mass %, and more preferably from 10 to 80 mass %, relative to the total of 2-cyanoacrylic acid ester. So long as the content of the compound represented by the general formula (1) is in the range of from 5 to 90 mass %, rapid hardening is attained upon impregnation, and a three-dimensional shaped object which is good particularly in cutting machinability can be obtained.

From the viewpoint of reinforcing effect and blooming prevention, preferred combinations of the compound represented by the general formula (1) with the compound represented by the general formula (2) include n-propyl 2-cyanoacrylate with methoxyethyl 2-cyanoacrylate, n-propyl 2-cyanoacrylate with ethoxyethyl 2-cyanoacrylate, i-propyl 2-cyanoacrylate with methoxyethyl 2-cyanoacrylate, i-propyl 2-cyanoacrylate with ethoxyethyl 2-cyanoacrylate, n-butyl 2-cyanoacrylate with methoxyethyl 2-cyanoacrylate, n-butyl 2-cyanoacrylate with ethoxyethyl 2-cyanoacrylate, i-butyl 2-cyanoacrylate with methoxyethyl 2-cyanoacrylate, i-butyl 2-cyanoacrylate with ethoxyethyl 2-cyanoacrylate, n-octyl 2-cyanoacrylate with methoxyethyl 2-cyanoacrylate, n-octyl 2-cyanoacrylate with ethoxyethyl 2-cyanoacrylate, 2-octyl 2-cyanoacrylate with methoxyethyl 2-cyanoacrylate, and 2-octyl 2-cyanoacrylate with ethoxyethyl 2-cyanoacrylate.

The impregnating composition may contain, so long as the effect of the invention is not impaired, another 2-cyanoacrylic acid ester than those represented by the general formula (1) and the general formula (2). The 2-cyanoacrylic acid esters other than those represented by the general formula (1) and the general formula (2) include, for instance, methyl and ethyl esters of 2-cyanoacrylic acid. The proportion of such 2-cyanoacrylic acid esters are, preferably 50 mass % or less, and more preferably 40 mass % or less, relative to the total amount of the 2-cyanoacrylic acid esters. So long as the content of these esters is 50 mass % or less, blooming of the shaped object can be suppressed while hardenability upon impregnation is improved.

The viscosity at 25° C. of the impregnating composition should be in the range of from 1 to 1000 mPa·s. The viscosity is preferably in the range of from 1 to 500 mPa·s, and more preferably in the range of from 1 to 300 mPa·s. If the viscosity is lower than 1 mPa·s, hardened layers sometimes can not be easily formed, thereby resulting in insufficient reinforcement, when the composition is impregnated to the three dimensional shaped object. On the other hand, if the viscosity exceeds 1000 mPa·s, the composition becomes difficult to impregnate to the three-dimensional shaped object, becomes slow in hardening, and cannot provide reinforcing effect. The viscosity of the impregnating composition can be adjusted by, for example, a thickener generally employed in 2-cyanoarylate-based adhesives, the blending ratio of the compounds represented by the general formulae (1) and (2), and a content of another additive.

The Shore hardness D of the hardened product of the impregnating composition should be in the range of from 20 to 75. The Shore hardness D is preferably in the range of from 25 to 65, and more preferably, in the range of from 30 to 55. If the Shore hardness D is lower than 20, the hardened product becomes so soft that no reinforcing effect may be obtained. If the Shore hardness D exceeds 75, cutting machinability tends to lower. The Shore hardness D can be adjusted by, for example, the content of the plasticizer described later, or the blending ratio of the compounds represented by the general formulae (1) and (2).

Preferably, the impregnating composition according to the present invention contains a plasticizer in addition to the above 2-cyanoacrylic acid ester. The plasticizer is a component which improves the cutting machinability of the hardened product of the impregnating composition, and may be any compound miscible with the 2-cyanoacrylic ester and having no adverse influence on polymerization and storage stability of the 2-cyanoacrylic ester. Examples of such a plasticizer include triethyl acetyl citrate, tributyl acetyl citrate, dimethyl glutarate, diethyl glutarate, dibutyl glutarate, dimethyl adipate, diethyl adipate, dibutyl adipate, dimethyl sebacate, diethyl sebacate, dibutyl sebacate, bis(2-ethylhexyl) sebacate, dimethyl phthalate, diethyl phthalate, dibutyl phthalate, diisodecyl phthalate, dihexyl phthalate, diheptyl phthalate, dioctyl phthalate, bis(2-ethylhexyl) phthalate, diisononyl phthalate, diisotridecyl phthalate, dipentadecyl phthalate, dioctyl terephthalate, diisononyl isophthalate, decyl toluate, bis(2-ethylhexyl) camphorate, 2-ethylhexyl-cyclohexyl carboxylate, diisobutyl fumarate, diisobutyl maleate, caproic acid triglyceride, 2-ethylhexyl benzoate, dipropylene glycol dibenzoate, trimethyl trimellitate, and trioctyl trimellitate. Preferred among them from the viewpoint of favorable miscibility with the 2-cyanoacrylic acid ester and high plasticizing efficiency are tributyl acetyl citrate, dimethyl adipate, dimethyl phthalate, 2-ethylhexyl benzoate, and dipropylene glycol dibenzoate. The plasticizers may be used alone or in a combination of two or more thereof.

The content of the plasticizers is preferably in a range of from 10 to 50 mass %, more preferably from 10 to 40 mass %, per 100 mass % of the total impregnating composition. So long as the content of the plasticizers is in the range of from 10 to 50 mass %, little influence is exerted on curability upon impregiation, improving cutting machinability of the three-dimensional shaped object.

In addition to the aforementioned components, the impregnating composition used in the present invention may contain stabilizers, thickeners, hardening accelerators, colorants, fragrances, solvents, strength improvers, and others that have been conventionally blended in the adhesive compositions containing 2-cyanoacrylic acid ester, in proper quantities to the extent that does not impair the effect of the present invention.

The stabilizers include (1) anion polymerization inhibitors, such as sulfur dioxide, aliphatic sulfonates such as methanesulfonate, aromatic sulfonates such as p-toluenesulfonate, boron trifluoride diethyl ether, $HBF_4$, and trialkyl borate; and (2) radical polymerization inhibitors, such as hydroquinone, hydroquinone monomethyl ether, t-butylcatechol, catechol, and pyrogallol. These stabilizers may be used alone, or in a combination of two or more thereof. The content of the stabilizers is preferably in a range of from 1 ppm to 1 part by mass, per 100 parts by mass of 2-cyanoacrylic acid ester.

The thickeners include, for example, polymethyl methacrylates, copolymers of methyl methacrylate and an acrylate, copolymers of methyl methacrylate and another methacrylate, acrylic rubbers, urethane rubbers, polyvinylchloride, polystyrene, cellulose esters, polyalkyl-2-cyanoacrylate, and ethylene-vinyl acetate copolymers. These thickeners may be used alone or in a combination of two or more thereof. The content of the thickeners is preferably in a range of from 0.1 to 20 parts by mass, per 100 parts by mass of 2-cyanoacrylic acid ester.

The hardening accelerators include, for example, polyalkylene oxides, crown ethers, silacrown ethers, calixarenes, oxacalixarenes, cyclodextrins, and pyrogallol-based cyclic compounds. These hardening accelerators may be used alone or in a combination of two or more thereof.

The polyalkylene oxides refer to polyalkylene oxides and the derivatives thereof; examples thereof include those disclosed in Japanese Patent Publication (Kokoku) No. S60-37836, Japanese Patent Publication (Kokoku) No. H01-43790, Japanese Patent Laid-open (Kokai) No. S63-128088, and Japanese Patent Laid-open (Kokai) No. H03-167279.

As the polyalkylene oxides, there can be mentioned, for example, diethylene glycol, triethylene glycol, tetraethylene glycol, polyethylene glycol, polypropylene glycol, poly(1,3-propylene glycol), polytrimethylene oxide, polytetramethylene oxide, polyepichlorohydrin, poly1,3-bis(chloromethyl)butylene oxide, polytetramethylene glycol, poly1,3-dioxolane, poly2,2-bis(chloromethyl)propylene oxide, ethylene oxide-propylene oxide block copolymers, polyglycerin such as diglycerin, triglycerin, and tetraglycerin, formaldehyde condensates, acetaldehyde condensates, trioxane polymers and various types of polyalkylene oxides commercially available as polyols for curing polyether type urethanes.

As derivatives of polyalkylene oxides, preferred representative examples include esters of the aforementioned polyalkylene oxides with acids, or ethers of the above polyalkylene oxides with hydroxyl-group containing compounds; however, they are not limited thereto, and those having a polyalkylene oxide structure within the molecule thereof, such as those having various types of substituents at terminals of the polyalkylene oxide, or those having another linkage portions inside the polyalkylene oxide may also be used.

Concrete examples of the esters of polyalkylene oxides include polyethylene glycol monoesters, polyethylene glycol diesters or polypropylene glycol diesters (wherein esters are, for example, acetates, trifluoroacetates, laurates, stearates, oleates, acrylates, or methacrylates), bisphenol A-polyalkylene oxide adducts (wherein alkylene is, for example, ethylene or propylene; and hereinafter, this means the same), hydrogenated bisphenol A-polyalkylene oxide adducts, trimethylolpropane-polyalkylene oxide adducts, glycerin-polyalkylene oxide adducts, polyoxyethylene sorbitan ester, tetraoleic acid-polyoxyethylene sorbitol, adipic acid-polyalkylene oxide adducts, trimellitic acid-polyalkylene oxide adducts, isocyanate compound-polyalkylene oxide adducts, phosphoric acid-polyalkylene oxide adducts, silicic acid-polyalkylene oxide adducts, (polyoxyalkylene)polyphosphate, and the like.

As concrete examples of the ethers of polyalkylene oxides, there can be mentioned diethylene glycol monoalkyl ethers, diethylene glycol dialkyl ethers or polyethylene glycol monoalkyl ethers (wherein alkyl includes, for example, methyl, ethyl, propyl, butyl, lauryl, cetyl, stearyl, oleyl, and perfluoroalkyl), polyethylene glycol monoaryl ethers, polyethylene glycol dialkyl ethers or polypropylene glycol dialkyl ethers (wherein alkyl includes, for example, methyl, ethyl, propyl, and butyl), polyethylene glycol diaryl ethers (wherein aryl includes, for example, phenyl, octylphenyl, and nonylphenyl).

Examples of the crown ethers include those disclosed in, for instance, Japanese Patent Publication (Kokoku) No. S55-2238, Japanese Patent Laid-open (Kokai) No. H03-167279, and Japanese Patent Laid-open (Kokai) No. 2002-201436. Concrete examples thereof include 12-crown-4, 15-crown-5, 18-crown-6, benzo-12-crown-4, benzo-15-crown-5, benzo-18-crown-6, dibenzo-18-crown-6, benzo-15-crown-5, dibenzo-24-crown-8, dibenzo-30-crown-10, tribenzo-18-crown-6, asym-dibenzo-22-crown-6, dibenzo-14-crown-4, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methylbenzo-18-crown-6, 1,2-tert-butyl-18-crown-6, 1,2-vinylbenzo-15-crown-5, and 1,2-benzo-1,4-benzo-5-oxygen-20-crown-7.

Examples of the silacrown ethers include, for example, those disclosed in Japanese Patent Laid-open (Kokai) No. S60-168775. Concrete examples thereof include dimethylsila-11-crown-4, dimethylsila-14-crown-5, and dimethylsila-17-crown-6.

Examples of the calixarenes and oxacalixarenes include those disclosed in the respective specifications of U.S. Pat. No. 4,556,700, U.S. Pat. No. 4,636,539, U.S. Pat. No. 4,718,966, and U.S. Pat. No. 4,855,461. Concrete examples thereof include tetrakis(4-t-butyl-2-methylenephenoxy) ethyl acetate, 25,26,27,28-tetra-(2-oxo-2-ethoxy)-ethoxycalix[4]arene, 5,11,17,23,29,35-hexa-tert-butyl-37,38,39, 40,41,42-hexahydroxycalix[6]arene, 37,38,39,40,41,42-hexahydroxycalix[6]arene, 37,38,39,40,41,42-hexa-(2-oxo-2-ethoxy)-ethoxycalix[6]arene, and 5,11,17,23,29,35,41,47-octa-tert-butyl-49,50,51,52,53,54,55,56-octa-(2-oxo-2-ethoxy)-ethoxycalix[8]arene.

Examples of the cyclodextrins include, for example, those disclosed in Japanese Patent Laid-open (Kohyo) No. H05-505835. Concrete examples thereof include α-, β-, or γ-cyclodextrins.

Examples of the pyrogallol-based cyclic compounds include compounds disclosed in Japanese Patent Laid-open (Kokai) No. 2000-191600. Concrete examples thereof include 3,4,5,10,11,12,17,18,19,24,25,26-dodecaethoxycarbomethoxy-C-1, C-8, C-15, C-22-tetramethyl[14]-metacyclophane.

The content of the aforementioned hardening accelerators is preferably in a range of from 50 ppm to 5 parts by mass, and more preferably from 100 ppm to 2 parts by mass per 100 parts by mass of 2-cyanoacrylic acid ester.

The method for reinforcing a three-dimensional shaped object according to the present invention is applicable to three-dimensional shaped objects manufactured by any type of process, however, it is favorably used to three-dimensional shaped objects obtained by powder binding process. Powder used in the powder bining process is not specifically limited as long as it is used for the three-dimensional modeling. Examples thereof include thermoplastic resins such as polyethylene, polypropylene, polymethylpentene, polyvinyl chloride, polytetrafluoroethylene, polystyrene, polyethylene terephthalate, polybutylene terephthalate, polysulfone, and polyphenylene oxide; crosslinked resins such as unsaturated polyester, divinylbenzene polymer, divinylbenzene-styrene copolymer, divinylbenzene-(meth)acrylate copolymer, and diallyl phthalate polymer; inorganic compounds such as spherical silica, glass beads, glass fibers, glass balloons, alumina, zirconia, zirconium silicate, hydroxyapatite, silicon carbide, silicon nitride, sodium chloride, calcium chloride, calcium carbonate, and gypsum; silicone compounds; and organic-inorganic complex particles containing organic polymer main chain and polysiloxane main chain. These powders are properly selected depending on the strength and texture required for the shaped object; however, from the viewpoint of curability of the impregnating composition used in the present invention, preferred are inorganic compounds. Since adsorbed moisture or anion species are present on the inorganic compounds, the impregnating composition permeating into the powder rapidly hardens.

The maximum particle diameter of the powder particles should be smaller than the thickness of the layers constituting the three-dimensional shaped object; as powder particles are finer, thinner shaped objects can be produced. The average particle size of the powder is preferably in a range of from 1 to 300 μm, more preferably in a range of from 5 to 100 μm, and still more preferably from 10 to 50 μm.

Conventionally utilized organic binders and inorganic binders can be employed as the binder for use in the aforementioned powder binding process. The organic binders are those of various types of polymer resins, and concrete examples thereof include natural resins, natural resin derivatives, phenolic resins, xylene resins, urea resins, melamine resins, ketone resins, cumarone-indene resins, petroleum resins, terpene resins, cyclized rubbers, chlorinated rubbers, alkyd resins, polyamide resins, polyvinyl chloride resins, acrylic resins, vinyl chloride-vinyl acetate copolymer resins, polyester resins, polyvinyl acetate, polyvinyl alcohol, polyvinyl butyral, chlorinated polypropylene, styrene resins, epoxy resins, urethane resins, and cellulose derivatives. Silicate-based inorganic binder can be used when the powder is ceramic.

The method for reinforcing a three-dimensional shaped object according to the present invention comprises coating a surface of a three-dimensional shaped object obtained by the aforementioned powder binding process or the like with an impregnating composition, and curing the composition to wholly or partially reinforce the object. The coating method for the impregnating composition is not particularly limited, and may be applied in shapes such as dots, lines, and spirals. Otherwise, a spray may be used for spray coating. Furthermore, when the entire object is reinforced, the shaped object may be immersed into a liquid of the impregnating composition.

After coating the shaped object, it may be left to stand as it is because the impregnating composition for use in the present invention is a one-component type that hardens at ordinary temperature. Hardening time varies depending upon the coating amount of the impregnating composition, and is usually several to several ten minutes for standing still before proceeding to the next step of cutting work, painting, and the like. Furthermore, to accelerate the hardening, a liquid containing a hardening accelerator may be sprayed onto the shaped object or the shaped object may be allowed to stand in a vessel under the atmosphere of a hardening accelerator. A preferable type of the accelerator is one containing an amine-based compound as an effective component.

EXAMPLES

The present invention is explained in further detail by way of Examples below, but the present invention is not particularly limited to these Examples to the extent of not departing from the gist of the present invention. In the description below, parts and percentages are based on mass unless otherwise mentioned.
1. Evaluation Method
(1) Viscosity
Viscosity was measured at 25° C. using E-type viscometer.
(2) Shore Hardness D
A 2 mm thick hardened body of 20 mm in diameter was prepared by curing an impregnating composition using a hardening accelerator "aa Setter (tradename)" manufactured by TOAGOSEI Co., Ltd. Shore hardness D of the resulting hardened body was measured at 25° C. As a Shore hardness meter, Model "HD-104N", manufactured by Ueshima Seisakusho Co., Ltd. was used.
(3) Reinforcing Effect
A shaped object (20 mm height×100 mm width×10 mm thickness) was made using a 3D printer, Model "ZPrinter 450", manufactured by 3D Systems, Inc. from gypsum powder that was used together with a polyvinyl alcohol-based water-soluble resin as a binder. The shaped object was immersed into a liquid of an impregnating composition for 30 minutes, and was allowed to air dry at room temperature for 24 hours to obtain a reinforced shaped object (test piece).

One end of the test piece was held with hand, and the other end was struck with hand to observe what resulted on the test piece for evaluation of the reinforcing effect as follows.
<Evaluation Criteria>
○: No cracks were observed on the test piece
x: Cracks generated on the test piece
(4) Cutting Machinability
The test piece prepared for the evaluation of the above reinforcing effect was cut with a knife to observe what resulted on the test piece for evaluation as follows.
<Evaluation Criteria>
○: The test piece was easily cut
Δ: The test piece was cut by applying force
x: Cracks generated on the test piece while cutting
(5) Blooming Phenomenon
The state of blooming on the test piece prepared for the evaluation of the above reinforcing effect was visually observed for evaluation as follows.
<Evaluation Criteria>
○: No blooming was observed
Δ: Blooming was partly observed
x: Apparent blooming occurred and badly affected the appearance of the test piece
2. Production and Evaluation of Impregnating Composition Example 1

To ethoxyethyl 2-cyanoacrylate were blended 40 ppm of sulfur dioxide and 1000 ppm of hydroquinone (provided that ethoxyethyl 2-cyanoacrylate was 100 parts by mass), and were stirred under room temperature to obtain an impregnating composition. The evaluation results are given in Table 1.

Examples 2 to 7 and Comparative Examples 1 to 6

The impregnating compositions described in Table 1 were each prepared and evaluated. The thickener given in Table 1 was as follows
  a polymethyl methacrylate, "DEGALAN" (Tradename), manufactured by Evonik Japan Co., Ltd. with weight average molecular weight of 300,000.

TABLE 1

|  | Examples | | | | | | | Comparative Examples | | | | | |
| --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 |
| Ethyl 2-cyanoacrylate |  |  |  |  | 10 |  |  | 100 |  | 88 | 70 |  |  |
| Isopropyl 2-cyanoacrylate |  |  | 60 | 65 | 50 | 60 | 20 |  | 100 |  |  | 95 | 45 |
| Octyl 2-cyanoacrylate |  | 100 |  |  |  |  |  |  |  |  |  |  |  |
| Ethoxyethyl 2-cyanoacrylate | 100 |  | 40 |  |  | 20 | 65 |  |  |  |  |  |  |
| Dimetyl phthalate |  |  |  |  | 40 |  | 10 |  |  |  | 30 |  | 55 |
| Tributyl acetyl citrate |  |  |  | 30 |  | 20 |  |  |  |  |  | 5 |  |
| Polymethyl methacrylate |  |  |  | 5 |  |  | 5 |  |  | 12 |  |  |  |
| Viscosity (mPa · s) | 10 | 10 | 10 | 100 | 5 | 10 | 100 | 2 | 2 | 2000 | 5 | 2 | 20 |
| Shore Hardness D | 60 | 45 | 65 | 50 | 40 | 40 | 50 | 90 | 80 | 90 | 60 | 80 | 15 |
| Reinforcing Effect | ○ | ○ | ○ | ○ | ○ | ○ | ○ | ○ | ○ | X | ○ | ○ | X |
| Cutting Machinability | Δ | ○ | Δ | ○ | ○ | ○ | ○ | X | X | X | Δ | X | Δ |
| Blooming Phenomenon | ○ | ○ | ○ | ○ | Δ | ○ | ○ | X | ○ | X | X | ○ | ○ |

Table 1 reads that the impregnating compositions obtained in Example 1 to 7 had no practical problems in all terms of reinforcing effect, cutting machinability, and whirtening phenomenon. On the other hand, the impregnating compositions obtained in Comparative Examples 1, 3, and 4, were all free of the 2-cyanoacrylic acid esters specified in the present invention, and suffered from bad appearance due to vigorous blooming. The impregnating compositions obtained in Comparative Examples 2 and 5 contained the 2-cyanoacrylic acid esters specified in the present invention, however, were poor in cutting machinability because Shore hardness D of the hardened product was higher than the range specified in the present invention. The impregnating composition obtained in Comparative Example 6 also contained the 2-cyanoacrylic acid ester specified in the present invention, however, was inferior in reinforcing effect because Shore hardness D of the hardened product was lower than the range specified in the present invention.

INDUSTRIAL APPLICABILITY

The method for reinforcing a three-dimensional shaped object according to the present invention can readily reinforce a shaped object without using a special apparatus because it utilizes an impregnating composition of one-component type that hardens at ordinary temperature. Furthermore, the shaped object thus obtained can be easily processed by cutting.

The invention claimed is:

1. A method for reinforcing a three-dimensional shaped object comprising (a) reinforcing the three-dimensional shaped object with an impregnating composition containing a 2-cyanoacrylic acid ester, in which the 2-cyanoacrylic acid ester is at least one selected from the group consisting of a compound represented by the following general formula (1) and the compound represented by the following general formula (2):

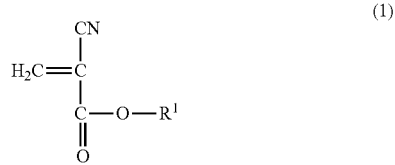

(1)

wherein $R^1$ represents a straight-chain or branched-chain alkyl group having from 3 to 12 carbon atoms, cycloalkyl group, allyl group, or aryl group; and

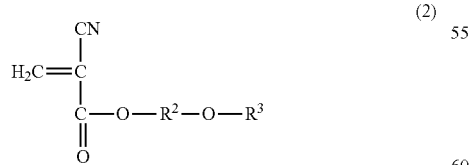

(2)

wherein $R^2$ represents an alkylene group having from 1 to 4 carbon atoms, and $R^3$ represents a straight-chain or branched-chain alkyl group having from 1 to 8 carbon atoms,
said impregnating composition having a viscosity at 25° C. in a range of from 1 to 1000 mPa·s and said impregnating composition having a Shore hardness D in a range of from 20 to 75 when being hardened.

2. The method for reinforcing a three-dimensional shaped object according to claim 1, wherein the impregnating composition comprises both the compound represented by the general formula (1) and the compound represented by the general formula (2).

3. The method for reinforcing a three-dimensional shaped object according to claim 2, wherein the impregnating composition further comprises a plasticizer.

4. The method for reinforcing a three-dimensional shaped object according to claim 2, wherein the method further comprises, before (a), producing the three-dimensional shaped object by a powder binding process in which the powder is an inorganic compound.

5. The method for reinforcing a three-dimensional shaped object according to claim 4, wherein the powder binding process is performed using a 3D printer.

6. The method for reinforcing a three-dimensional shaped object according to claim 4, wherein the powder has an average particle size of from 1 to 300 μm.

7. The method for reinforcing a three-dimensional shaped object according to claim 1, wherein the impregnating composition further comprises a plasticizer.

8. The method for reinforcing a three-dimensional shaped object according to claim 7, wherein the method further comprises, before (a), producing the three-dimensional shaped object by a powder binding process in which the powder is an inorganic compound.

9. The method for reinforcing a three-dimensional shaped object according to claim 8, wherein the powder binding process is performed using a 3D printer.

10. The method for reinforcing a three-dimensional shaped object according to claim 8, wherein the powder has an average particle size of from 1 to 300 μm.

11. The method for reinforcing a three-dimensional shaped object according to claim 1, wherein the method further comprises, before (a), producing the three-dimensional shaped object by a powder binding process in which the powder is an inorganic compound.

12. The method for reinforcing a three-dimensional shaped object according to claim 11, wherein the powder binding process is performed using a 3D printer.

13. The method for reinforcing a three-dimensional shaped object according to claim 11, wherein the powder has an average particle size of from 1 to 300 μm.

14. A method for reinforcing a three-dimensional shaped object comprising
(a) impregnating a composition containing a 2-cyanoacrylic acid ester into the three-dimensional shaped object; and
(b) curing the impregnated composition,
in which the 2-cyanoacrylic acid ester is at least one selected from the group consisting of a compound represented by the following formula (1) and a compound represented by the following formula (2):

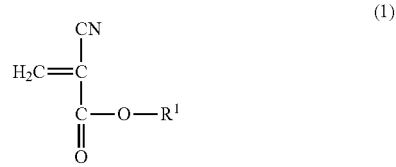

(1)

wherein R¹ represents a straight-chain or branched-chain alkyl group having from 3 to 12 carbon atoms, cycloalkyl group, allyl group, or aryl group; and

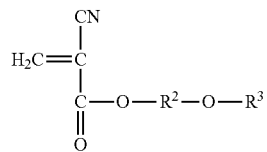

(2)

wherein R² represents an alkylene group having from 1 to 4 carbon atoms, and R³ represents a straight-chain or branched-chain alkyl group having from 1 to 8 carbon atoms, said composition having a viscosity at 25° C. in a range of from 1 to 1000 mPa·s, and said composition having a Shore hardness D in a range of from 20 to 75 when being hardened.

15. The method for reinforcing a three-dimensional shaped object according to claim 14, wherein the three-dimensional shaped object is one produced by a powder binding process in which the powder is an inorganic compound.

16. The method for reinforcing a three-dimensional shaped object according to claim 15, wherein the powder binding process is performed using a 3D printer.

17. The method for reinforcing a three-dimensional shaped object according to claim 16, wherein the powder has an average particle size of from 1 to 300 μm.

18. The method for reinforcing a three-dimensional shaped object according to claim 17, wherein said composition is impregnated into the three-dimensional shaped object by coating a surface of the three-dimensional shaped object with said composition.

19. The method for reinforcing a three-dimensional shaped object according to claim 17, wherein said composition is impregnated into the three-dimensional shaped object by immersing the three-dimensional shaped object into a liquid of said composition.

* * * * *